(12) United States Patent
Smith et al.

(10) Patent No.: US 8,530,028 B2
(45) Date of Patent: Sep. 10, 2013

(54) LOCALIZED DEEP SOFT AREA OF A TRIM PANEL

(75) Inventors: Nels R. Smith, Zeeland, MI (US); Bart W. Fox, Zeeland, MI (US); Tony M. Pokorzynski, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 382 days.

(21) Appl. No.: 12/522,132

(22) PCT Filed: Jan. 3, 2008

(86) PCT No.: PCT/US2008/050131
§ 371 (c)(1),
(2), (4) Date: Dec. 30, 2009

(87) PCT Pub. No.: WO2008/086105
PCT Pub. Date: Jul. 17, 2008

(65) Prior Publication Data
US 2010/0171333 A1    Jul. 8, 2010

Related U.S. Application Data

(60) Provisional application No. 60/878,929, filed on Jan. 5, 2007.

(51) Int. Cl.
*B60R 13/02* (2006.01)

(52) U.S. Cl.
USPC ........................................ 428/102; 428/316.6

(58) Field of Classification Search
USPC ................................................ 428/102, 316.6
See application file for complete search history.

(56) References Cited

U.S. PATENT DOCUMENTS

| | | | | |
|---|---|---|---|---|
| 2,616,823 A | * | 11/1952 | Weymouth | 428/137 |
| 3,389,043 A | * | 6/1968 | Clark | 428/102 |
| 3,675,289 A | * | 7/1972 | Mark | 29/91 |
| 5,845,458 A | * | 12/1998 | Patel | 52/782.1 |
| 6,004,498 A | * | 12/1999 | Fujii et al. | 264/255 |
| 2007/0210484 A1 | * | 9/2007 | Fantin et al. | 264/259 |
| 2008/0157432 A1 | * | 7/2008 | Boyer | 264/257 |

FOREIGN PATENT DOCUMENTS

| EP | 1 287 961 A2 | 3/2003 |
|---|---|---|
| WO | WO 2006/056691 A | 6/2006 |
| WO | WO 2006/060677 A | 6/2006 |

OTHER PUBLICATIONS

International Search Report for corresponding PCT Application No. PCT/US2008/050131, dated Jun. 27, 2008, 1 page.
Chinese First Office Action and its English Translation dated Dec. 5, 2011 as received in corresponding China Application No. 200880005885.7, 8 pages.

* cited by examiner

*Primary Examiner* — Alexander Thomas
(74) *Attorney, Agent, or Firm* — Foley & Lardner LLP

(57) ABSTRACT

A trim panel and method of forming a trim panel for a vehicle. The trim panel can include a localized cushioned portion of softness (150) at pre-selected locations on the panel.

12 Claims, 5 Drawing Sheets

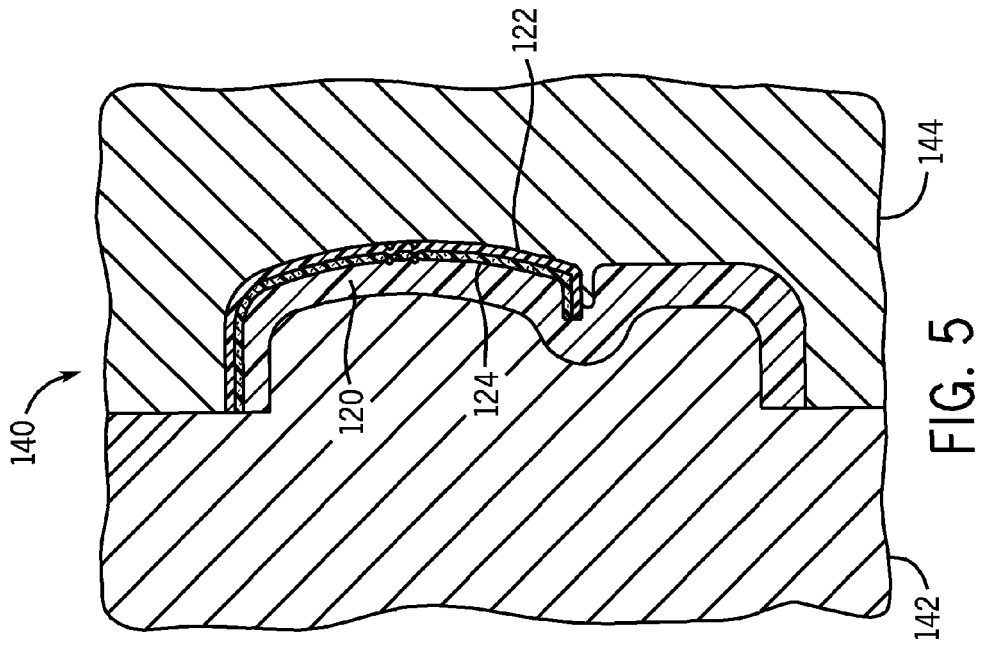
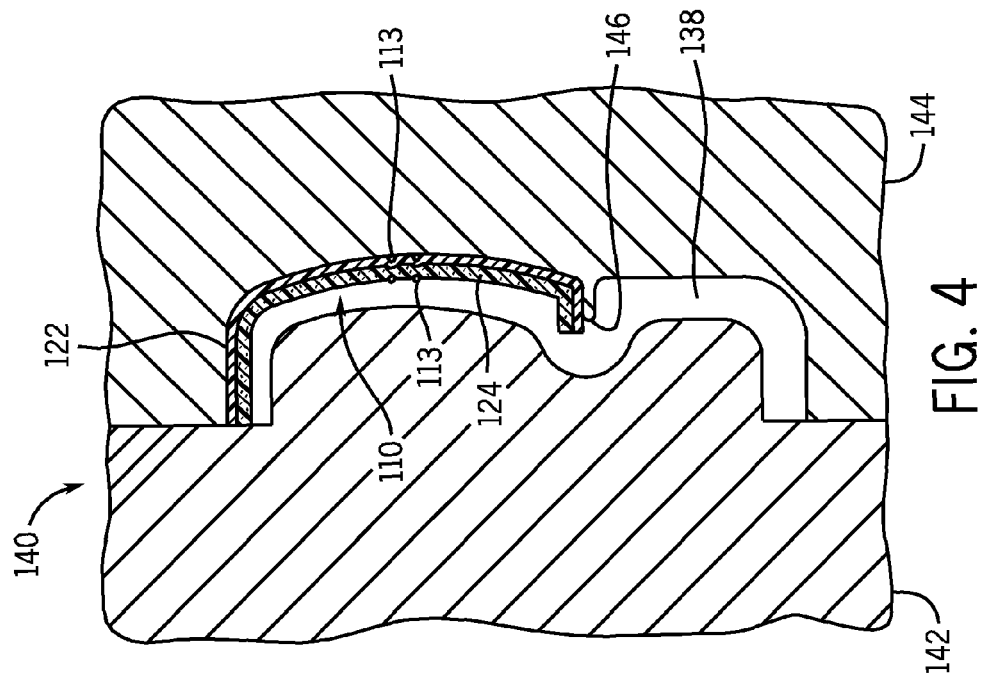

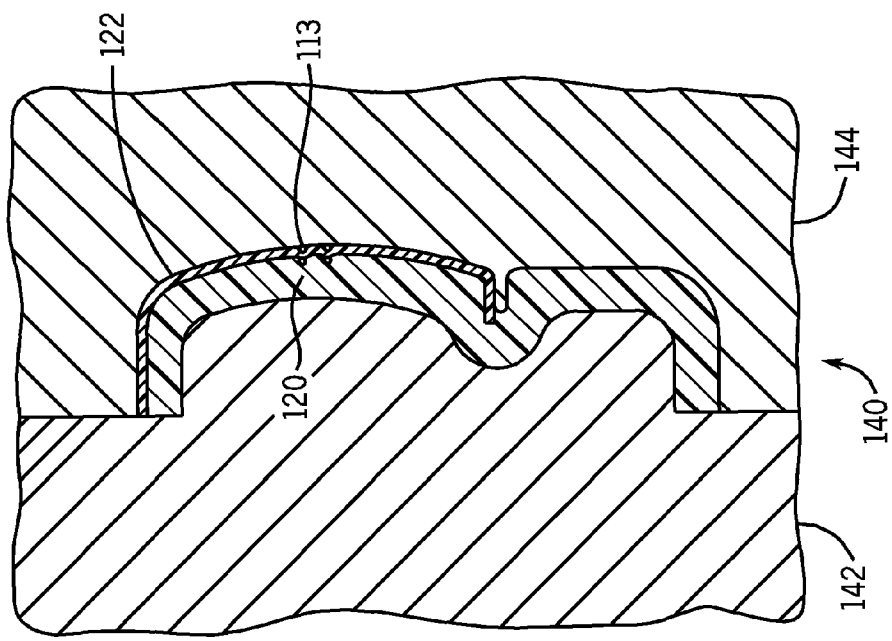
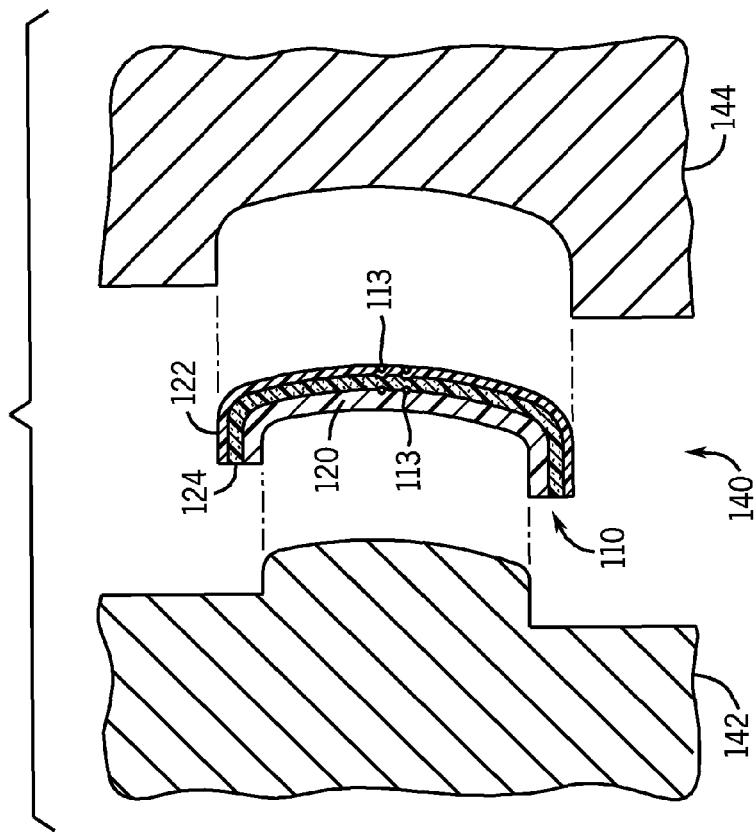

LOCALIZED DEEP SOFT AREA OF A TRIM PANEL

CROSS-REFERENCE TO RELATED APPLICATIONS

This Application is a National Stage of PCT/US2008/050131, filed Jan. 3, 2008, which claims the benefit and priority to U.S. Provisional Application Ser. No. 60/878,929, filed Jan. 5, 2007. The foregoing applications are incorporated by reference herein in their entirety.

BACKGROUND

The present application relates to the field of molded articles having soft portions with stitching, embroidery and/or other sewn portions (which will collectively be referred to as "stitching"). More specifically, the present application further relates to interior trim panels or structures for vehicles (e.g., automobiles such as cars, trucks, and the like; airplanes, boats, etc.) or other applications that include at least one relatively localized deep soft area (e.g., padded or cushioned) portion formed by a partial-mold-behind (PMB) process that also has stitching (decorative or functional).

It is generally known to provide padded or cushioned vehicle interior components with stitching. Such stitching may be decorative/ornamental and/or functional. The padded or cushioned vehicle interior components may take the form of a trim panel (e.g., instrument panel, door panel, etc.). Such panels typically include a substrate made of a relatively rigid material, a relatively soft core (e.g., a foam layer), and an outer surface or skin. Various methods of providing such cushioning and stitching are known in the art, although such known methods do not provide certain advantageous features and/or combination of features. For example, it is known to add stitching to interior components to the skin (or skin and foam laminate) and then attach the skin to the substrate by a hand or manually wrapping technique. It is also known to apply the stitching after the interior component has been formed (e.g., after the skin, foam, and substrate has been joined). However, such known methods of applying decorative stitching are labor-intensive or do not provide the desired visual effect of depth that would be provided by a recessed stitch (e.g., "quilting" or cushioning effect that provides contour change in the soft surface). Therefore, such recessed stitching provided by known costly manufacturing processes are typically only available on premium or luxury class vehicles.

Accordingly, there is a need to provide a method for producing components such as panels or other structures for use in vehicles that includes a relatively additional soft portion or section with decorative stitching. There is also a need to provide a component that has selected regions of localized deep soft cushioning with decorative stitching. There is also a need to provide components and a method for making components that may be manufactured in a relatively simple and efficient manner with reduced manufacturing and material costs.

The present application further relates to various features and combinations of features shown and described in the disclosed embodiments.

SUMMARY

There is provided a method of forming in a mold a trim panel having a localized cushioned area. A preform laminate comprising a compressible material is sandwiched between a flexible skin and a back skin. An extra foam pad is coupled to the preform laminate at a pre-selected portion of the preform laminate. The preform laminate is positioned in the mold. The compressible material is compressed by introducing a molten polymeric material to the mold forming a substrate and bonding the substrate to the preform laminate forming the trim panel. The trim component is removed from the mold.

There is further provided a trim panel having a localized cushioned area for a vehicle which comprises a preform laminate comprising a compressible material sandwiched between a flexible skein and a back skin. An extra foam pad is coupled to the preform laminate at a pre-selected portion of the preform laminate. A substrate is coupled to the preform laminate, wherein a crease along a boundary simulates a seam and establishes a contour change having an appearance in the secondary area different than in the primary area.

There is provided a method of forming in a mold a trim panel. A preform laminate includes a compressible material and a flexible skin. The preform laminate is positioned in the mold. The compressible material is compressed by introducing a molten polymeric material to the mold to form a substrate and bonding the substrate to at least a portion of the preform laminate to form the trim panel. The preform laminate folds to create a crease along a boundary to simulate a seam and provide a contour change.

There is further provided a trim panel for a vehicle. A preform laminate includes a compressible material and a flexible skin. A substrate is coupled to at least a portion of the preform laminate. The preform laminate defines a crease along a boundary to simulate a seam and provide a contour change.

BRIEF DESCRIPTION OF THE DRAWINGS

FIGS. 4-6 are schematic views of exemplary embodiments of a method of forming a trim panel having a coverstock with embedded stitching.

FIG. 7 is a schematic view of an alternative embodiment of a coverstock with stitching positioned in a mold after injection of a plastic to form the substrate.

DETAILED DESCRIPTION

Figure 1:
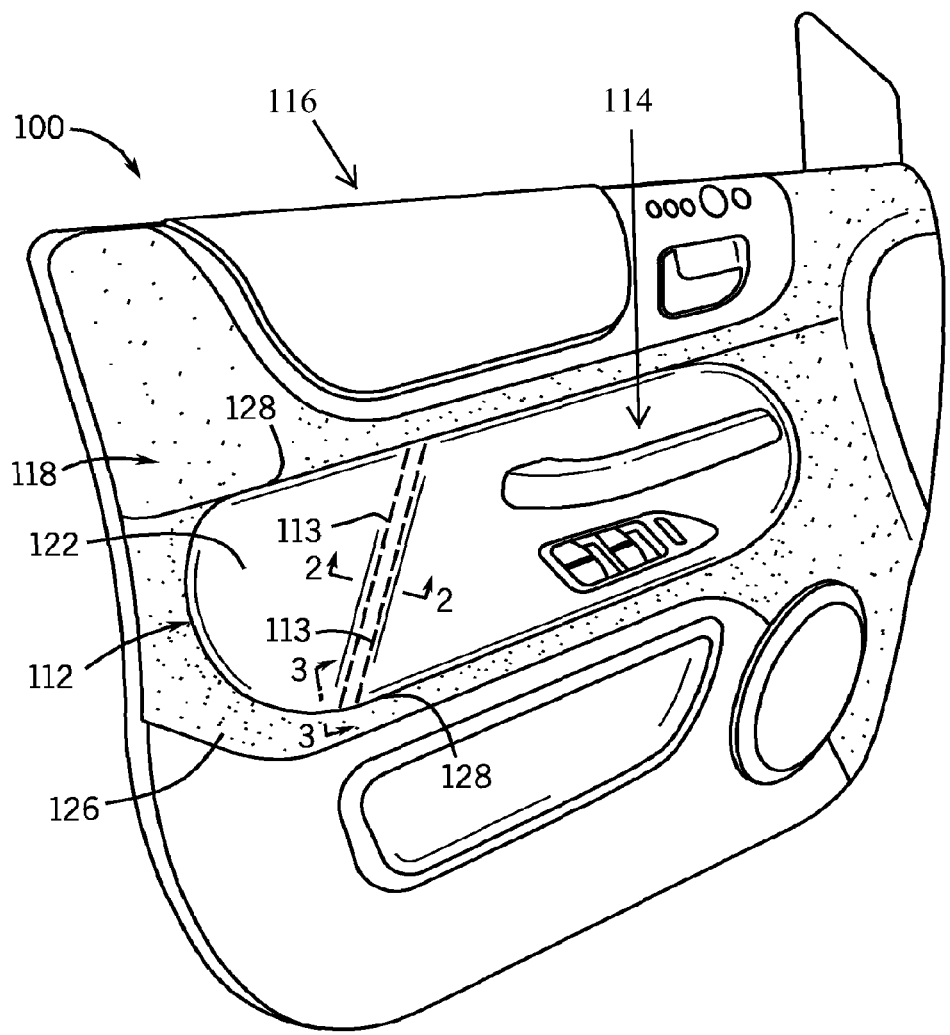
FIG. 1 is a perspective view of an embodiment of a door trim panel having a cushioned region with stitching.

FIG. 1 illustrates one exemplary embodiment of a component or assembly such as a panel or other structure for use in a vehicle (e.g., automobiles such as cars, trucks, buses, and the like; airplanes, boats, etc.). Such components may be provided in a wide variety of sizes, shapes, and configurations according to various exemplary embodiments. For example, such components may be utilized in an interior passenger compartment of a vehicle, and may find utility in the form of door panels, dashboards, instrument panels, consoles, sidewall trim, overhead liners, or other vehicle components or portions thereof. The exemplary component is a door panel 100 and includes one or more localized or discrete portions 112 (e.g., areas, regions, etc.) of softness or cushion that have stitching 113 (e.g., seam, embroidery, and/or other sewn portion, which will collectively be referred to as stitching 113). The door panel is provided with cushioning in portions 112 where a portion of a passenger's body may or is likely to contact the door (e.g., on an armrest 114, adjacent a window sill 116, etc.) without the need to provide cushioning in the entire door. For example, the door panel may also include one or more portions 118 (e.g., areas, regions, islands, etc.) of hard plastic in areas not typically contacted by a passenger. Stitching 113 may provide any of a variety of or combination of decorative, ornamental, and/or functional purposes.

The methods of providing localized cushioned portions 112 of softness or cushioning in a manner described herein may be utilized to provide components having a wide variety of configurations and uses. Portion 118 may include bezels, accents, appliqués, pull cups, complex geometries (e.g., ball armrests, x, y, z boundaries, etc.), proud (e.g., raised) or recessed regions of cushioning for enhanced aesthetics, or the like.

Figure 2:
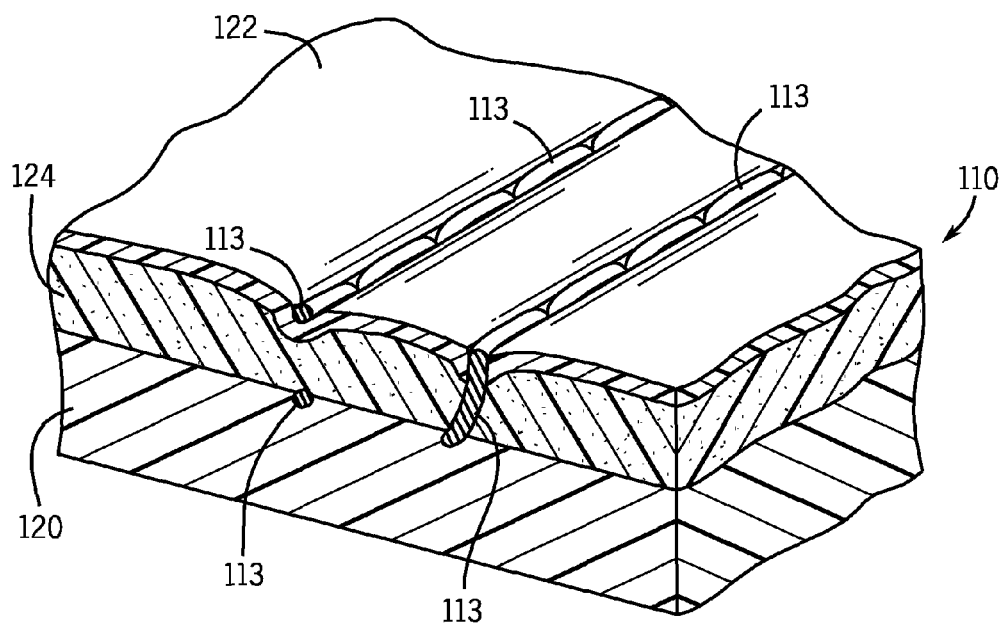
FIG. 2 is a fragmentary perspective section view of the door trim panel of FIG. 1 taken along the line 2-2.
Figure 3:
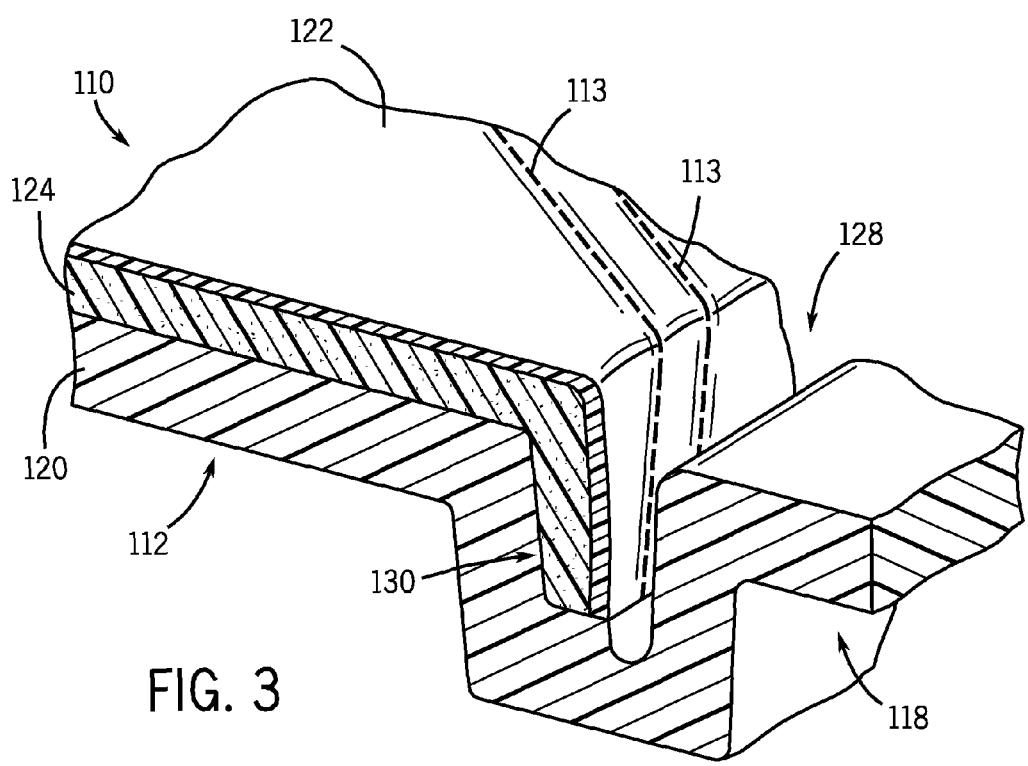
FIG. 3 is a fragmentary perspective section view of the door trim panel of FIG. 1 taken along the line 3-3.

Referring to FIGS. 1-3, door panel 100 includes a member or element in the form of a relatively rigid substrate, base, or stratum (referred to herein as a "substrate" 120). Cushioned portion 112 is located adjacent or proximate to at least a portion of substrate 120, and comprises a coverstock 110 coupled to substrate 120. According to an exemplary embodiment, coverstock 110 comprises a skin 122 and a filler or compressible material 124 provided intermediate or between skin 122 and substrate 120. According to exemplary embodiments, portions of skin 122 may be in direct contact with substrate 120 (i.e., no compressible material 124 between skin 122 and substrate 120 such as shown in FIG. 7), while other portions of skin 122 may be separated from substrate 120 by compressible material 124. In this manner, selectively varying amounts or degrees of softness or cushioning are provided at one or more localized regions while retaining the look and feel of the skin even in those regions not provided with the additional cushioning of compressible material 124. The particular design chosen may depend on any of a variety of factors, including the desired look and feel of the outer surface of the panel, materials costs, ease of manufacturing, etc.

According to an exemplary embodiment, the cushioned portion 112 is disposed on or over at least a portion of substrate 120. Skin 122 forms at least a portion of the exterior surface (e.g., the portion visible from a passenger compartment, which is typically referred to as the "A" surface or side) of the component. According to an exemplary embodiment, a portion 126 of substrate 120 not covered by coverstock 110 may also form a portion of the exterior surface ("A" surface). Referring to FIG. 3, a boundary 128 between substrate 120 and skin 122 may be provided in the form of a seam, interface or joint, or the like. Such boundary 128 may be visible at the exterior surface ("A" surface) or may be eliminated or reduced in size by being filled in with a material (e.g., a caulk, adhesive, liquid polymer, or other materials) to provide a "seamless" look for the component at the interface of skin 122 and substrate 120. As shown in FIGS. 1 and 3, boundary 128 is formed or provided so that substrate 120 forms a frame around skin 122. The size, shape, and configuration of boundary 128 may vary in various exemplary embodiments. FIG. 3 illustrates one exemplary embodiment showing the coupling between the skin and the substrate.

Any of a variety of configurations may be utilized for the interface of the edges of the skin and the substrate. According to an exemplary embodiment, a flange 130 is formed on skin 122 by forming in a vacuum mold (e.g., to provide an edge of the skin with a "folded back" configuration to form a protrusion). Substrate 120 is then molded around flanges 130 of skin 122 (and compressible material 124). According to a preferred embodiment, skin 122 and substrate 120 are coupled together such that a relatively airtight and/or watertight seal is provided. In one example, the skin includes flanges 130 that extend substantially entirely about the periphery of skin 122, and substrate 120 is molded around flanges 130 to at least partially encapsulate the flange 130 (e.g., to form a channel or groove that extends substantially entirely about the periphery of the area over which skin 122 is provided and receive the flanges 30). Various sizes, shapes, and configurations may be used for the protrusion or flanges and the opening or groove to couple skin 122 to substrate 120.

Substrate 120 provides a base or support layer for skin 122 and compressible material 124. Substrate 120 may be made of any suitable material, including any of a variety of polymers (e.g., polypropylene, polyethylene, copolymers, compressed fibers, TPO, filled plastics, polycarbonate ABS blends, ABS, or any of a variety of other materials). Substrate 120 may be formed in any of a wide variety of shapes, sizes, and configurations (see, e.g., FIG. 1, which shows door panel 100 according to an exemplary embodiment having regions of localized cushioning), and may include a variety of other features (e.g., apertures for door locks and handles, molded-in designs, etc.). Substrate 120 may be formed by any of a variety of methods, including injection molding, thermoforming, or the like. Portions of substrate 120 that form part of the "A" surface may have any of a variety of textures, colors, indicia, features, and the like. Substrate 120 may be a stand-alone component or may be a component in a larger assembly (e.g., the substrate may be an entire door panel or may be a portion thereof, etc.).

According to an exemplary embodiment, skin 122 is made of a relatively soft or flexible material comprising a polymeric material (e.g., a thermoplastic olefin (TPO), polyurethane, polyvinylchloride (PVC), etc.). According to other exemplary embodiments, skin 122 may be made of other materials, including textiles such as cloth, leather, composite materials, layered materials (e.g., a layer of leather applied above a polymeric material layer), etc. Skin 122 may have a size, shape, and configuration that is adapted or configured to features included in substrate 120. Skin 122 may be manufactured or produced utilizing any of a variety of process. According to a preferred embodiment, skin 122 (e.g., a TPO sheet) is thermoformed (e.g., vacuum formed, pressure formed, etc.) and then trimmed to a desired shape or configuration. In a vacuum molding process, a pre-cut or formed sheet of polymeric material is provided in a mold and heated to soften the material. A vacuum is applied to the mold, which draws the softened polymeric material toward the walls of the mold. The polymeric material then cools and maintains the shape defined by the mold walls. The formed sheet may also be trimmed for desired size. According to an alternative embodiment, the skin is formed by a slush molding process wherein thermoplastic material in a liquid or powdered form is introduced into a temperature-controlled mold to form a viscous skin adjacent to the mold walls; once the skin is formed, the excess material is removed from the mold and the skin is allowed to cure and cool, after which the skin is removed from the mold. According to other alternative embodiments, skin 122 is manufactured according to various other methods. For example, the skin may be formed in an injection molding process, an extrusion process, a casting process (e.g., gravity casting), or any other suitable process for forming a polymeric skin. According to an exemplary embodiment in which skin 122 is made of a polymeric material, the skin preferably has a thickness of between approximately 0.1 and 2.0 millimeters, and most preferably between approximately 0.8 and 1.0 millimeters.

According to an exemplary embodiment, compressible material 124 is coupled (e.g., bonded, fused, adhered, fastened, attached, etc.) to skin 122 and located in between skin 122 and substrate 120 to act as a "filler" or soft layer. It is intended that such material acts as a relatively soft or cushioning material to provide the cushioned member with at least a portion of its relatively soft or cushioned characteristic. According to a preferred embodiment, the compressible material is a polymeric material such as a foam material (e.g., urethane foam, closed cell foam, open celled foam, etc.). According to an alternative embodiment shown in FIG. 7, stitching 113 is applied to skin 122 without having a compressible material 124 (i.e., to provide a different level of softness). As such, stitching 113 may be provided to skin 122 with compressible material 124, or without compressible material 124; and the thickness of the skin layer and the compressible material layer may be varied according to the desired softness.

According to a preferred embodiment, skin 122 is coupled to the substrate 122 so that the compressible material 124 (if any) is located intermediate or between at least a portion of skin 122 and at least a portion of substrate 120. As such, the "A" surface of the door panel may be provided by at least a portion of substrate 120 and/or at least a portion of skin 122.

According to a particular exemplary embodiment, door trim panel 100 shown in FIG. 5 includes an integrated bolster and armrest. This embodiment utilizes a die-cut, compressible filler material 124, such as a die-cut closed cell foam attached (via pressure sensitive adhesives or like processes) to the vac-form skin 122. The part is then placed into a tool and plastic is molded around the assembly to form substrate 120. Where the compressible material 124 (and skin 122) is present, there is a soft compressible feel to the part. Where there is no compressible material 124 behind skin 122, there is a harder feel to the part.

Stitching 113 is applied to skin 122 or (preferably) to a laminate of skin 122 and compressible material 124. Stitching 113 may be applied by any of a variety of conventional techniques (e.g., hand sewn, machine sewn, etc.). Stitching 113 may be made from any of a variety of materials, such as fabric, textile (e.g., cotton), polymer (e.g., nylon, etc.), or other material which may or may not melt or liquify upon application of heat. Applying stitching 113 to the laminate of skin 122 and compressible material 124 (or to just skin 122) before substrate 120 is molded is intended to recess stitching 113 in skin 122 and/or compressible material 124. During molding of substrate 120 as shown in FIGS. 4-6, compressible material 124 is compressed by the injection of the molten resin that forms substrate 120. Stitching 113 compresses less (and preferably substantially less) than compressible material 124 and/or skin 122 such that skin 122 and compressible material 124 are forced around stitching 113. During the molding process, substrate 120 bonds (e.g., mechanically and/or chemically (e.g., thermally or fusion)) to stitching 113. When the molded article is removed from the mold tool or fixture, compressible material 124 expands away from substrate 120 (and around stitching 113) to provide the visual effect that stitching 113 is recessed (e.g., providing a "quilting" or a contour change with the appearance that that portion of the trim panel is cushioned).

According to an exemplary embodiment, a method of forming the trim panel comprises forming the flexible skin 122; coupling the compressible material 124 to skin 122; applying the stitching 113 to skin 122/compressible material 124 laminate; die cutting skin 122/compressible material 124 to a desired shape (if necessary); positioning skin 122 and compressible material 124 in a space or gap 138 of a mold 140; and forming rigid substrate 120 around skin 122 and compressible material 124 providing a first soft region 112 wherein the compressible material 124 is disposed between skin 122 and substrate 120 so that a first soft region 112 is defined by the compressible material 124. As the plastic material or resin is injected into the space 138, compressible material 124 is compressed from the pressure of the injected plastic. As the panel 100 is removed from mold 140, compressible material 124 expands around stitching 113 to provide the desired appearance.

Figure 8:
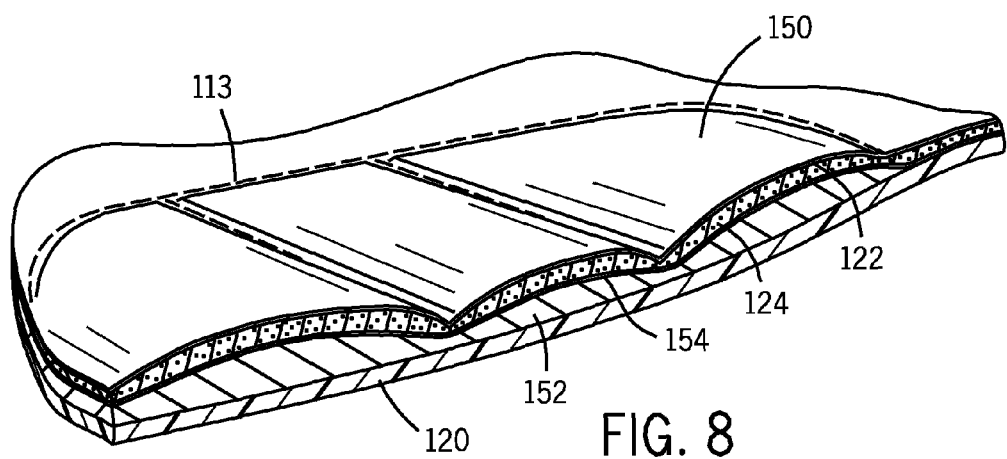
FIG. 8 is a partial cross-section of an exemplary embodiment of a trim panel including a localized deep soft area and stitching.
Figure 9:
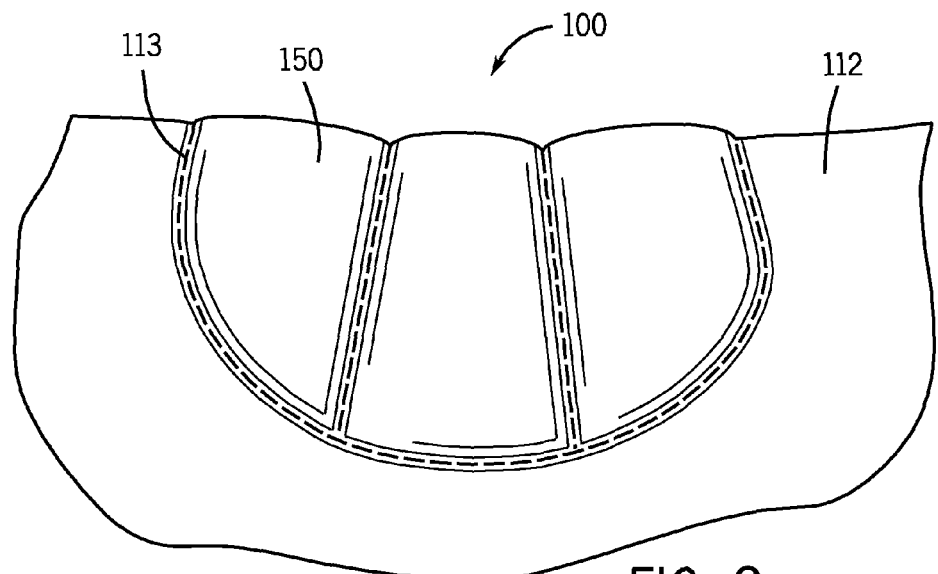
FIG. 9 is a top perspective view of an exemplary embodiment of a trim panel including a localized deep soft area.

According to an exemplary embodiment illustrated in FIGS. 8 and 9, a localized deep soft area 150 is applied to a trim panel to provide additional softness and compression in selected portions of the trim panel. An extra foam pad 152 is coupled to the back side of the skin 122 at a pre-selected portion of the skin 122. A preferred method to couple the extra foam pad 152 to the skin 122 is to sew (stitch) the extra foam pad 152 and a backing layer 154 to the skin 122. Such method creates a bond between the extra foam pad 152 and the skin 122 and anchors the extra foam pad 152 and backing layer 154 in place and resists the force of the plastic flow front during the molding process described herein.

An exemplary embodiment is illustrated in FIG. 8, the extra foam pad 152 and backing layer 154 are stitched to the vinyl outer skin 122. The backing layer 154 can be, for example, polypro backplay. A compressible material 124 and substrate 120 are coupled to the backing layer. FIG. 9 is a top view of an exemplary embodiment of a trim panel including a localized deep soft area 150.

The trim panel 100 can be provided with multiple colors by changing the grade of materials used for the skin of the cover stock 110. Color accents, for example, pin-striping, decorative panels, or bezels, may be included during the molding process. The multiple color panels, since they are molded as one piece, provide strength to the trim panel. The trim panel can be, for example, an instrument panel, or a door panel or other interior component of a vehicle.

According to exemplary embodiments shown in FIGS. 4-6, the method comprises a partial mold-behind process where skin 122 with stitching 113 (and compressible material 124 as prescribed) provide a portion of the A-surface of the molded article (i.e., the side of the molded article that is visible to the vehicle occupant). Mold 140 comprises a first mold section (shown as a core 142) and a second mold section (shown as a cavity 144). Cavity 144 includes a projection 146 (e.g., blade, member, pin, etc.) comprising a thin member extending from cavity 144. Coverstock 110 is coupled to cavity 144 (e.g., suspended from pins held in place by clamps, thrust members, or the like), and mold 140 is closed. According to an alternative embodiment, the coverstock is coupled to the core. Melted resin is injected into space 138 between the mold sections and presses or forces coverstock 110 against the cavity 144. Projection 146 maintains the edge of coverstock 110 in place so plastic flows around it to form a recess or boundary 128 (see FIG. 3). Edges of coverstock 110 may also then be wrapped and coupled to substrate 120 (e.g., tacked, welded, fastened, bonded, joined, etc.). According to an exemplary embodiment, the process further includes forming the recess in the substrate and encapsulating at least one edge of the coverstock within the molten polymeric material that forms a portion of the substrate that defines the recess. A portion of the stitching may be encapsulated (e.g., captured, bonded to, coupled to, etc.) by the molten polymeric material.

For purposes of this disclosure, the term "coupled" means the joining of two components (electrical or mechanical)

directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature It is also important to note that the construction and arrangement of the elements of the vehicle trim panel as shown in the preferred and other exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, the compressible material may be coupled to the skin and positioning the skin and compressible material in a mold; and forming a rigid substrate around the skin and compressible material providing a first soft region wherein the compressible material is disposed between the skin and the substrate so that a first soft region is defined by the compressible material. Stitching may be provided on either the portion of the skin adjacent the first shot, or the second shot, or the third shot, or the like. The substrate may comprise a molded polymer material such as a thermoplastic. The skin may comprise a thermoplastic olefin and be formed by vacuum forming and trimming a sheet. The compressible material may comprise a foam material such as a closed cell foam. The skin may comprise flanges so that the substrate can be molded to at least partially encapsulate the flanges. A second soft region may be defined by a portion of the skin in direct contact with the substrate (e.g., the compressible material is not disposed between the skin and the substrate). The molding technique may also be employed in other application besides for vehicle interiors. Accordingly, all such modifications, as well as others, are intended to be included within the scope of this application. The order or sequence of any process or method steps may be varied or re-sequenced according to alternative embodiments. Other substitutions, modifications, changes and/or omissions may be made in the design, operating conditions and arrangement of the preferred and other exemplary embodiments.

What is claimed is:

1. A trim panel for a vehicle comprising:
   a preform laminate comprising a compressible material and a flexible skin;
   an extra foam pad coupled to the preform laminate at a pre-selected portion of the preform laminate;
   a substrate coupled to at least a portion of the preform laminate; and
   a crease along a boundary of the extra foam pad simulating a seam and establishing a contour change having an appearance in a secondary area different than in a primary area;
   wherein an A-surface of the trim panel is provided by at least a portion of the flexible skin, at least a portion of the crease, and at least a portion of the substrate.

2. The trim panel of claim 1 including a stitch feature positioned along a seam and configured to secure the extra foam pad to the preform laminate.

3. The trim panel of claim 1, wherein the seam extends around an outer periphery of the extra foam pad.

4. The trim panel of claim 3, further comprising a stitch extending around the seam, wherein the stitch couples the extra foam pad to a back skin and the flexible skin of the preform laminate, wherein the back skin is disposed between the compressible material and the extra foam pad.

5. The trim panel of claim 4, wherein the stitch contacts an inner surface of the substrate configured adjacent to the extra foam pad, but the stitch does not penetrate the substrate.

6. The trim panel of claim 5, further comprising a second stitch extending from the seam across the cushioned secondary area to provide a quilted appearance, wherein the second stitch couples the extra foam pad to the back skin and the flexible skin of the preform laminate, and wherein the second stitch contacts the inner surface of the substrate, but the second stitch does not penetrate substrate.

7. A trim panel for a vehicle comprising:
   a rigid substrate;
   a preform laminate comprising a compressible material and a flexible skin;
   a foam pad provided between the perform laminate and the substrate; and
   a stitch coupling the preform laminate to the foam pad along a seam to provide a contour change,
   wherein the stitch contacts an inner surface of the substrate configured adjacent to the foam pad, but the stitch does not penetrate the substrate.

8. The trim panel of claim 7, wherein an A-surface of the trim panel is provided by at least a portion of the flexible skin and at least a portion of the substrate.

9. The trim panel of claim 7, further comprising a boundary in the form of one of a recess, seam, interface, joint, or frame provided along a periphery of the foam pad, wherein an A-surface of the trim panel is provided by at least a portion of the boundary and at least a portion of the flexible skin.

10. The trim panel of claim 9, wherein the A-surface of the trim panel is also provided by at least a portion of the substrate and at least a portion of the flexible skin.

11. The trim panel of claim 7, wherein at least a portion of the stitch extends into the boundary.

12. The trim panel of claim 11, further comprising a boundary in the form of a physical discontinuity provided between the substrate and the preform laminate, wherein an A-surface of the trim panel is provided by at least a portion of the physical discontinuity.

* * * * *